(12) United States Patent
Sheng et al.

(10) Patent No.: US 10,685,094 B2
(45) Date of Patent: Jun. 16, 2020

(54) DIGITAL RIGHTS MANAGEMENT (DRM) METHOD AND SYSTEM FOR INTELLIGENT OPERATING SYSTEM

(71) Applicants: Academy of Broadcasting Science, State Administration of Press, Publication, Radio, Film & Television, Beijing (CN); Unitend Technologies Inc., Beijing (CN); BEIJING NOVEL-SUPER DIGITAL TV TECHNOLOGY CO., LTD, Beijing (CN)

(72) Inventors: Zhifan Sheng, Beijing (CN); Xingjun Wang, Beijing (CN); Lei Wang, Beijing (CN); Zhijian Liang, Beijing (CN); Xiaoxia Guo, Beijing (CN); Jing Zhang, Beijing (CN); Peiyu Guo, Beijing (CN)

(73) Assignees: Beijing Novel-Super Digital TV Technology Co., LTD, Beijing (CN); Academy of Broadcasting Science, State Administration of Press, Publication, Radio, Film & Television, Beijing (CN); Unitend Technologies, Inc., Beijing (CN)

( * ) Notice: Subject to any disclaimer, the term of this patent is extended or adjusted under 35 U.S.C. 154(b) by 244 days.

(21) Appl. No.: 15/781,143

(22) PCT Filed: Dec. 1, 2016

(86) PCT No.: PCT/CN2016/108207
§ 371 (c)(1),
(2) Date: Jun. 3, 2018

(87) PCT Pub. No.: WO2017/092688
PCT Pub. Date: Jun. 8, 2017

(65) Prior Publication Data
US 2018/0357394 A1   Dec. 13, 2018

(30) Foreign Application Priority Data

Dec. 3, 2015 (CN) .......................... 2015 1 0882753

(51) Int. Cl.
*H04L 29/06* (2006.01)
*G06F 21/10* (2013.01)
(Continued)

(52) U.S. Cl.
CPC ............ *G06F 21/105* (2013.01); *G06F 21/10* (2013.01); *G06F 21/12* (2013.01); *H04L 9/0825* (2013.01);
(Continued)

(58) Field of Classification Search
CPC ............ H04N 21/2541; G06Q 20/1235; H04L 2209/603; H04L 2463/101; G06F 2009/45587
See application file for complete search history.

(56) References Cited

U.S. PATENT DOCUMENTS

2006/0080529 A1   4/2006   Yoon et al.
2009/0119217 A1   5/2009   Ham
(Continued)

FOREIGN PATENT DOCUMENTS

| CN | 101350718 A | 1/2009 |
| CN | 104581214 A | 4/2015 |
| CN | 106845160 A | 6/2017 |

OTHER PUBLICATIONS

Chinese First Office Action for Application No. 201510882753.4, dated Nov. 1, 2017.
(Continued)

*Primary Examiner* — Thaddeus J Plecha
(74) *Attorney, Agent, or Firm* — Rimon PC

(57) ABSTRACT

A digital rights management (DRM) method for an intelligent operating system comprises: acquiring a play list of
(Continued)

media data to be played and encrypted media data; inquiring and acquiring one or more DRM application modules, wherein the DRM application module contains an identifier of a trusted application module; requesting DRM authorization by the DRM application module from a DRM server, judging a content permission and acquiring an encrypted content encryption key (ECEK) and transmitting the ECEK to a TEE; after judging that the content permission is legitimate; decrypting the ECEK acquired by the trusted application module which is in the TEE and corresponds to the trusted application module identifier to acquire a content encryption key (CEK), and decrypting the encrypted media data by using the CEK; and storing the decrypted media data in a security cache region for decoding and outputting.

18 Claims, 5 Drawing Sheets

(51) Int. Cl.
  *H04N 21/254* (2011.01)
  *G06F 21/12* (2013.01)
  *H04L 9/08* (2006.01)
  *G06Q 20/12* (2012.01)
  *G06F 9/455* (2018.01)
(52) U.S. Cl.
  CPC ....... *H04N 21/254* (2013.01); *H04N 21/2541* (2013.01); *G06F 2009/45587* (2013.01); *G06Q 20/1235* (2013.01); *H04L 2209/603* (2013.01); *H04L 2463/101* (2013.01)

(56) References Cited

U.S. PATENT DOCUMENTS

| | | | |
|---|---|---|---|
| 2009/0327692 A1* | 12/2009 | Lecomte | H04L 63/0428 713/150 |
| 2010/0185854 A1* | 7/2010 | Burns | G06F 21/10 713/165 |
| 2014/0007251 A1* | 1/2014 | Spitz | G06F 21/36 726/26 |
| 2014/0095890 A1* | 4/2014 | Mangalore | G06F 21/10 713/189 |
| 2015/0222633 A1* | 8/2015 | Smith | H04L 63/10 726/29 |
| 2015/0229471 A1* | 8/2015 | Nair | H04L 9/0822 713/171 |
| 2015/0294122 A1* | 10/2015 | Verma | G06F 21/10 713/193 |
| 2016/0191595 A1* | 6/2016 | Poornachandran | H04L 65/607 709/219 |

OTHER PUBLICATIONS

Chinese Second Office Action for Application No. 201510882753.4, dated Jan. 30, 2018.
Chinese Notification to Grant Patent Right for Invention, dated Mar. 9, 2018.
State Intellectual Property Office of the People's Republic of China, International Search Report for International Application No. PCT/CN2016/108207, dated Mar. 2, 2017.
Written Opinion of the International Searching Authority for Application No. PCT/CN2016/108207 dated Mar. 2, 2017.

* cited by examiner

DIGITAL RIGHTS MANAGEMENT (DRM) METHOD AND SYSTEM FOR INTELLIGENT OPERATING SYSTEM

CROSS-REFERENCE TO RELATED APPLICATIONS

This application is a National Stage of International Application No. PCT/CN2016/108207, filed on Dec. 1, 2016, which claims priority to Chinese Patent Application No. 201510882753.4, filed on Dec. 3, 2015, both of which are hereby incorporated by reference in their entireties.

FIELD OF THE INVENTION

The present invention relates to the field of conditional access technologies, and in particular, to a digital rights management (DRM) method and system for an intelligent operating system.

BACKGROUND OF THE INVENTION

With the development of digital audio/video coding technologies, particularly the issuing of H265/high efficiency video coding (HEVC) video coding standards, the mainstream mobile phones/PADs and set top box chips begin to support the H265/HEVC. The operation of ultra high definition (UHD)/4K content becomes feasible. More and more operators take the UHD/4K business as the next business growth point.

The content providers, particularly large film companies, come up with stricter copyright protection requirements on the high quality contents such as high definition, UHD/4K content, etc. Meanwhile, in terms of the requirements of the large film companies on the content protection, the market formulates security requirement standards of the high quality content protection specific to DRM systems and DRM terminals.

The GY/T 277-2014 *Technical Specification of Digital Rights Management for Internet Television* (hereinafter "China DRM standards" for short) issued by the State Administration of Press, Publication, Radio, Film and Television of China in May, 2014 defines the content packaging formats, rights description and authorization, rights acquisition protocols, trust and security systems, etc. A new standard basis is provided for implementing the DRM systems. The China DRM standards have been widely applied in the fields such as Internet television, IPTV, etc.

In order to meet the security requirements of the operators and the content on the DRM terminals, there are mainly software and hardware implementation ways for the security of the DRM terminals.

The software implementation ensures the content encryption keys and content security mainly by realizing the DRM functions such as security algorithm and security storage, etc., in a software manner. The main technologies comprise code obfuscation, debugging prohibition, signature validation tamper-proofing, white box encryption key, etc. Since the resources such as the CPU and memory required by software execution lack effective and reliable protection means, attackers could acquire terminal private keys, content encryption keys, decrypted content, decoded output content and the like very easily, and the effective protection on the high quality content cannot be provided. Therefore, it is difficult for the software implementation manner to be accepted by the operators and content operators.

The hardware implementation manner realizes the DRM functions such as encryption key storage, content decryption, security media paths, output protection and security algorithms mainly by means of hardware resources. Mainstream chip manufacturers also release a solution of high security chips which are accepted by the operators and content operators. However, since the high security chips generally have a high requirement on hardware, only customized operating systems can be operated and intelligent (television) operating systems cannot be operated. In addition, in order to ensure the security, customized DRM terminal agent software needs to be burnt in the high security chips to finish the DRM functions. The DRM terminal agent software cannot be updated online. Multiple DRM agents cannot be supported either, and the constantly changing DRM requirements cannot be met.

Therefore, there is a need for a DRM method which not only can ensure the security of the copyright content, but also can adapt to the switching among a plurality of DRM mechanisms and can be applied in an intelligent operating system.

SUMMARY OF THE INVENTION

An objective of the present invention is to provide a new technical solution of the DRM for an intelligent operating system.

According to a first aspect of the present invention, there is provided a digital rights management (DRM) method for an intelligent operating system, the method is implemented in an intelligent device provided with the intelligent operating system, the intelligent device comprises a trusted execution environment (TEE) and the method comprises the following steps.

A play list of media data to be played and encrypted media data are acquired, wherein the play list comprises play address information and DRM information of the media data to be played, and the DRM information contains a DRM application module identifier for identifying a DRM application module adopted by the media data to be played.

One or more DRM application modules registered in the operating system are inquired, and the DRM application module corresponding to the DRM application module identifier is acquired and loaded, wherein the DRM application module contains an identifier for identifying a trusted application (TA) module adopted by the DRM application module in the TEE.

DRM authorization is requested by the DRM application module from a DRM server, and a DRM content license is acquired and analyzed, thereby judging a content permission and acquiring an encrypted content encryption key (ECEK) and transmitting the ECEK to the TEE.

After judging that the content permission is legitimate, the encrypted media data is stored to a shared cache region between the TEE and the intelligent operating system.

The ECEK is acquired by the TA module which is in the TEE and corresponds to the TA module identifier contained by the DRM application module, the ECEK is decrypted based on a preset content encryption key (CEK) decryption mechanism in the TA module to acquire a CEK, and the encrypted media data stored in the shared cache region is decrypted by using the CEK.

The decrypted media data is stored in a security cache region for decoding and outputting.

Preferably, the TEE comprises a hardware resource, a TEE internal API and a security operating system which are isolated from the intelligent operating system.

Preferably, the step of acquiring and loading the DRM application module corresponding to the DRM application module identifier further comprises: before loading the DRM application module, checking whether a signature of the DRM application module is legitimate, and loading the DRM application module in the case that the signature is legitimate.

Preferably, before the step of inquiring one or more DRM application modules registered in the operating system, the method further comprises a step of: registering such one or more DRM application modules in the intelligent operating system.

Preferably, the method further comprises the following step.

The decrypted media data is acquired from the security cache region and decoded, and output by high-bandwidth digital dontent protection (HDCP).

Preferably, the preset CEK decryption mechanism in the TA module comprises:

acquiring a private key paired with a public key adopted by encryption of the CEK from a one time programmable (OTP) memory chip of the intelligent device or the security storage region of the TEE for decrypting the ECEK.

According to a second aspect of the present invention, there is provided a DRM method for an intelligent operating system, the method is implemented in an intelligent device provided with the intelligent operating system, the intelligent device comprises a TEE and the method comprises the following steps.

A play list of media data to be played and encrypted media data are acquired by a media play application, wherein the play list comprises play address information and DRM information of the media data to be played, and the DRM information contains a DRM application module identifier for identifying a DRM application module adopted by the media data to be played.

One or more DRM application modules registered in the operating system are inquired, and the DRM application module corresponding to the DRM application module identifier is acquired and loaded, wherein the DRM application module contains an identifier for identifying a TA module adopted by the DRM application module in the TEE.

DRM authorization is requested by the DRM application module from a DRM server, and a DRM content license is acquired and transmitted to the TEE.

The DRM content license is analyzed by the TA module which is in the TEE and corresponds to the TA module identifier contained by the DRM application module, thereby judging a content permission and acquiring an ECEK.

After judging that the content permission is legitimate, the encrypted media data is stored to a shared cache region between the TEE and the intelligent operating system.

By the TA module which is in the TEE and corresponds to the TA module identifier contained by the DRM application module, the ECEK is decrypted based on a preset CEK decryption mechanism in the TA module to acquire a CEK, and the encrypted media data stored in the shared cache region is decrypted by using the CEK.

The decrypted media data is stored in a security cache region for decoding and outputting.

Preferably, in the above method, the TEE comprises a hardware resource, a TEE internal API and a security operating system which are isolated from the intelligent operating system.

Preferably, the step of acquiring and loading the DRM application module corresponding to the DRM application module identifier comprises: before loading the DRM application module, checking whether a signature of the DRM application module is legitimate, and loading the DRM application module in the case that the signature is legitimate.

Preferably, before the step of inquiring one or more DRM application modules registered in the operating system, the method further comprises a step of: registering the DRM application modules in the intelligent operating system.

Preferably, the method further comprises the following step.

The decrypted media data is acquired from the security cache region and decoded, and output by HDCP.

Preferably, the preset CEK decryption mechanism in the TA module comprises: acquiring a private key paired with a public key adopted by encryption of the CEK from a chip of the intelligent device or the security storage region of the TEE for decrypting the ECEK.

According to a third aspect of the present invention, there is provided a DRM system for an intelligent operating system, the DRM system is disposed in an intelligent device provided with the intelligent operating system, and the intelligent device comprises a media processing module, a DRM management service module and a TEE.

The media processing module comprises a play information acquisition module, configured to acquire a play list of media data to be played and encrypted media data, wherein the play list comprises play address information and DRM information of the media data to be played, and the DRM information contains a DRM application module identifier for identifying a DRM application module adopted by the media data to be played.

The DRM management service module comprises: a DRM application matching module, configured to inquire one or more DRM application modules registered in the operating system, and acquire and load the DRM application module corresponding to the DRM application module identifier, wherein the DRM application module contains an identifier for identifying a TA module adopted by the DRM application module in the TEE.

The loaded DRM application module comprises: a DRM content license acquisition module, configured to request DRM authorization from a DRM server to acquire a DRM content license; and a DRM content license parsing module, configured to analyze the acquired content license, thereby judging a content permission and acquiring an ECEK, and transmitting the ECEK to the TEE.

The media processing module further comprises: a media storage module, configured to, after judging that the content permission is legitimate, store the encrypted media data to a shared cache region between the TEE and the intelligent operating system.

The TEE comprises one or more TA modules.

The TA module corresponding to the TA module identifier contained by the DRM application module comprises: an ECEK decryption module, configured to acquire the ECEK, and decrypt the ECEK based on a preset CEK decryption mechanism in the TA module to acquire a CEK; and a media data decryption module, configured to decrypt the encrypted media data stored in the shared cache region by using the CEK, and store the decrypted media data in a security cache region for decoding and outputting.

Preferably, the TEE comprises a hardware resource, a TEE internal API and a security operating system which are isolated from the intelligent operating system.

Preferably, the DRM application module matching module is further configured to, before loading the DRM application module, check whether a signature of the DRM application module is legitimate, and load the DRM application module in the case that the signature is legitimate.

Preferably, the DRM management service module further comprises a DRM application registering module, configured to register the DRM application modules in the intelligent operating system.

Preferably, the media processing module further comprises: a media data decoding module, configured to acquire and decode the decrypted media data from the security cache region, and output the decoded decrypted media data by HDCP.

Preferably, the preset CEK decryption mechanism in the TA module comprises: acquiring a private key paired with a public key adopted by encryption of the CEK from a chip of the intelligent device or the security storage region of the TEE for decrypting the ECEK.

According to a fourth aspect of the present invention, there is provided a DRM system for an intelligent operating system, the DRM system is disposed in an intelligent device provided with the intelligent operating system, and the intelligent device comprises a media processing module, a DRM management service module and a TEE.

The media processing module comprises: a play information acquisition module, configured to acquire a play list of media data to be played and encrypted media data, wherein the play list comprises play address information and DRM information of the media data to be played, and the DRM information contains a DRM application module identifier for identifying a DRM application module adopted by the media data to be played.

The DRM management service module comprises: a DRM application matching module, configured to inquire one or more DRM application modules registered in the operating system, and acquire and load the DRM application module corresponding to the DRM application module identifier, wherein the DRM application module contains an identifier for identifying a TA module adopted by the DRM application module in the TEE.

The loaded DRM application module comprises: a DRM content license acquiring unit, configured to request DRM authorization from a DRM server, acquire a DRM content license, and transmit the DRM content license to the TEE.

The TEE comprises one or more TA modules.

The TA module corresponding to the TA module identifier contained by the DRM application module comprises: a DRM content license parsing module, configured to analyze the DRM content license, thereby judging a content permission and acquiring an ECEK; and an ECEK decryption module, configured to, after judging that the content permission is legitimate, decrypt the ECEK based on a preset CEK decryption mechanism in the TA module to acquire a CEK.

The media processing module further comprises: a media storage module, configured to, after judging that the content permission is legitimate, store the encrypted media data to a shared cache region between the TEE and the intelligent operating system.

The TA module further comprises: a media data decryption module, configured to decrypt the encrypted media data stored in the shared cache region by using the CEK, and store the decrypted media data in a security cache region for decoding and outputting.

Preferably, the TEE comprises a hardware resource, a TEE internal API and a security operating system which are isolated from the intelligent operating system.

Preferably, the DRM application module matching module is further configured to, before loading the DRM application module, check whether a signature of the DRM application module is legitimate, and load the DRM application module in the case that the signature is legitimate.

Preferably, the DRM management service module further comprises a DRM application registering module, configured to register the DRM application modules in the intelligent operating system.

Preferably, the media processing module further comprises: a media data decoding module, configured to acquire and decode the decrypted media data from the security cache region, and output the decoded decrypted media data by HDCP.

Preferably, the preset CEK decryption mechanism in the TA module comprises: acquiring a private key paired with a public key adopted by encryption of the CEK from a chip of the intelligent device or the security storage region of the TEE for decrypting the ECEK.

The inventors of the present invention found that in the prior art, for the intelligent operating system, particularly an intelligent television operating system, there are no DRM methods that not only can ensure the security of copyright content, but also can adapt to the switching among a plurality of DRM mechanisms and can be applied to the intelligent operating system. Therefore, the technical task to be realized or the technical problem to be solved by the present invention is never conceived or unexpected by those skilled in the art. Hence, the present invention belongs to a new technical solution.

Other features and advantages of the present invention will become apparent from the following detailed description of exemplary embodiments of the present invention with reference to the accompanying drawings.

BRIEF DESCRIPTION OF THE DRAWINGS

The accompanying drawings, which are incorporated in and constitute a part of the description, illustrate embodiments of the present invention and, together with the description thereof, serve to explain the principles of the present invention.

DETAILED DESCRIPTION OF THE EMBODIMENTS

Figure 1:
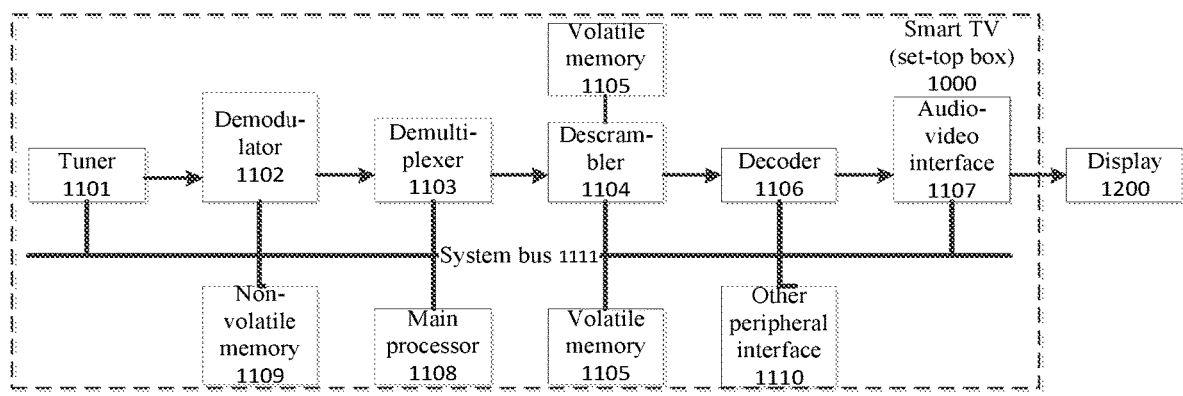
FIG. 1 shows a block diagram of the hardware configuration of a smart television 1000 capable of implementing the embodiments of the present invention.

Various exemplary embodiments of the present invention will now be described in detail with reference to the accompanying drawings. It should be noted that the relative arrangement, numerical expressions and numerical values of the components and steps set forth in these examples do not limit the scope of the invention unless otherwise specified.

The following description of at least one exemplary embodiment is in fact merely illustrative and is in no way intended as a limitation to the present invention and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

<Hardware Configuration>

FIG. 1 a block diagram of the hardware configuration of a smart television 1000 capable of implementing the embodiments of the present invention.

As shown in FIG. 1, the smart television 1000 typically comprises a main processor 1108, a tuner 1101 for receiving a television signal, a demodulator 1102, a nonvolatile memory 1109, a demultiplexer 1103, a descrambler 1104, a volatile memory 1105, a decoder 1106, an audio/video interface 1107 and other peripheral interfaces 1110 which are respectively connected by a system bus 1111. The smart television integrated by a television and a set top box further comprises a display 1200.

An intelligent operating system, an application program, other program modules and certain program data reside in the nonvolatile memory 1109.

The smart television as shown in FIG. 1 is merely illustrative but not intended to limit the present invention, the use or the application thereof in any way.

First Embodiment

Figure 2:
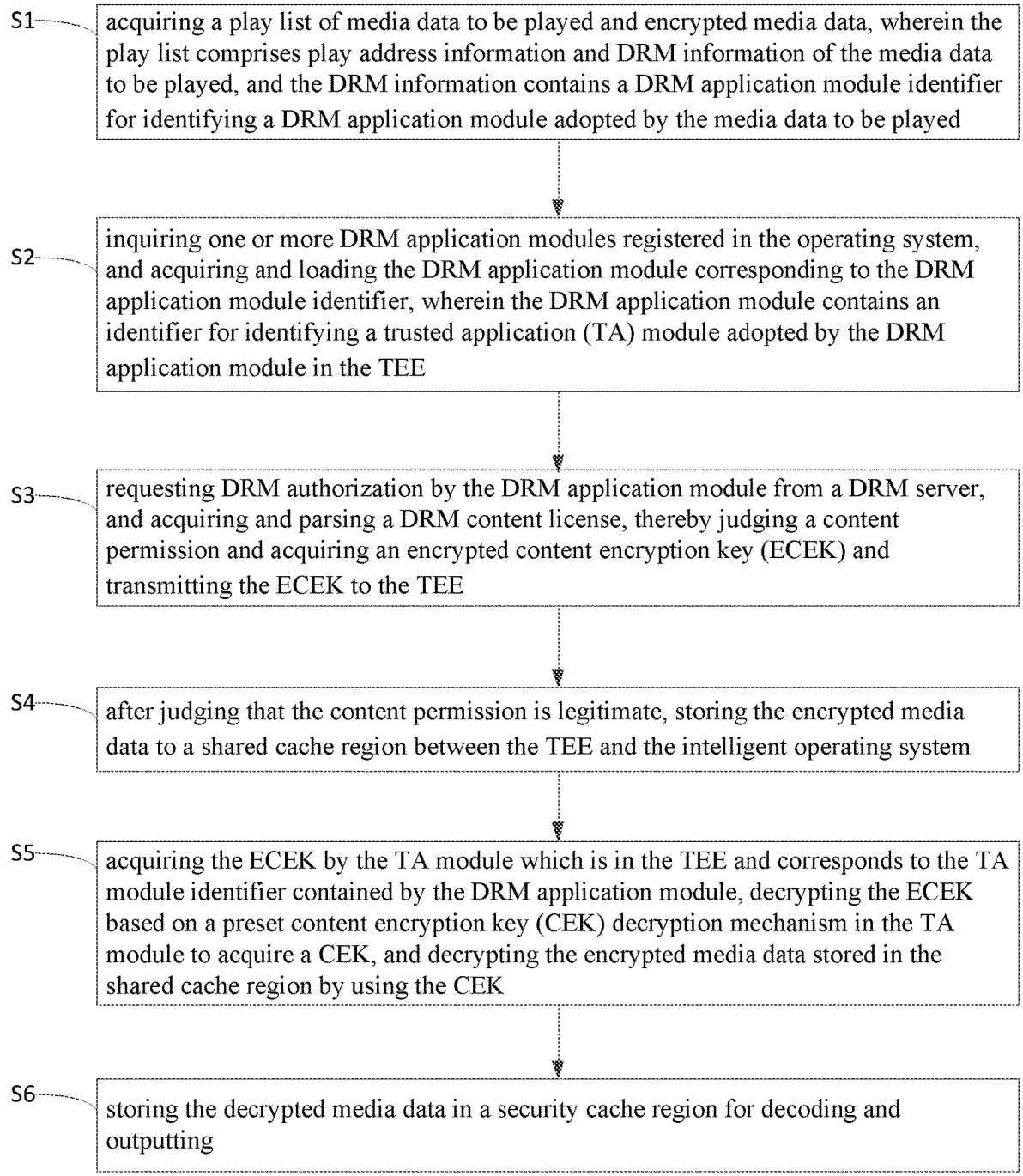
FIG. 2 shows a flowchart of a DRM method for an intelligent operating system according to a first embodiment of the present invention.
Figure 3:
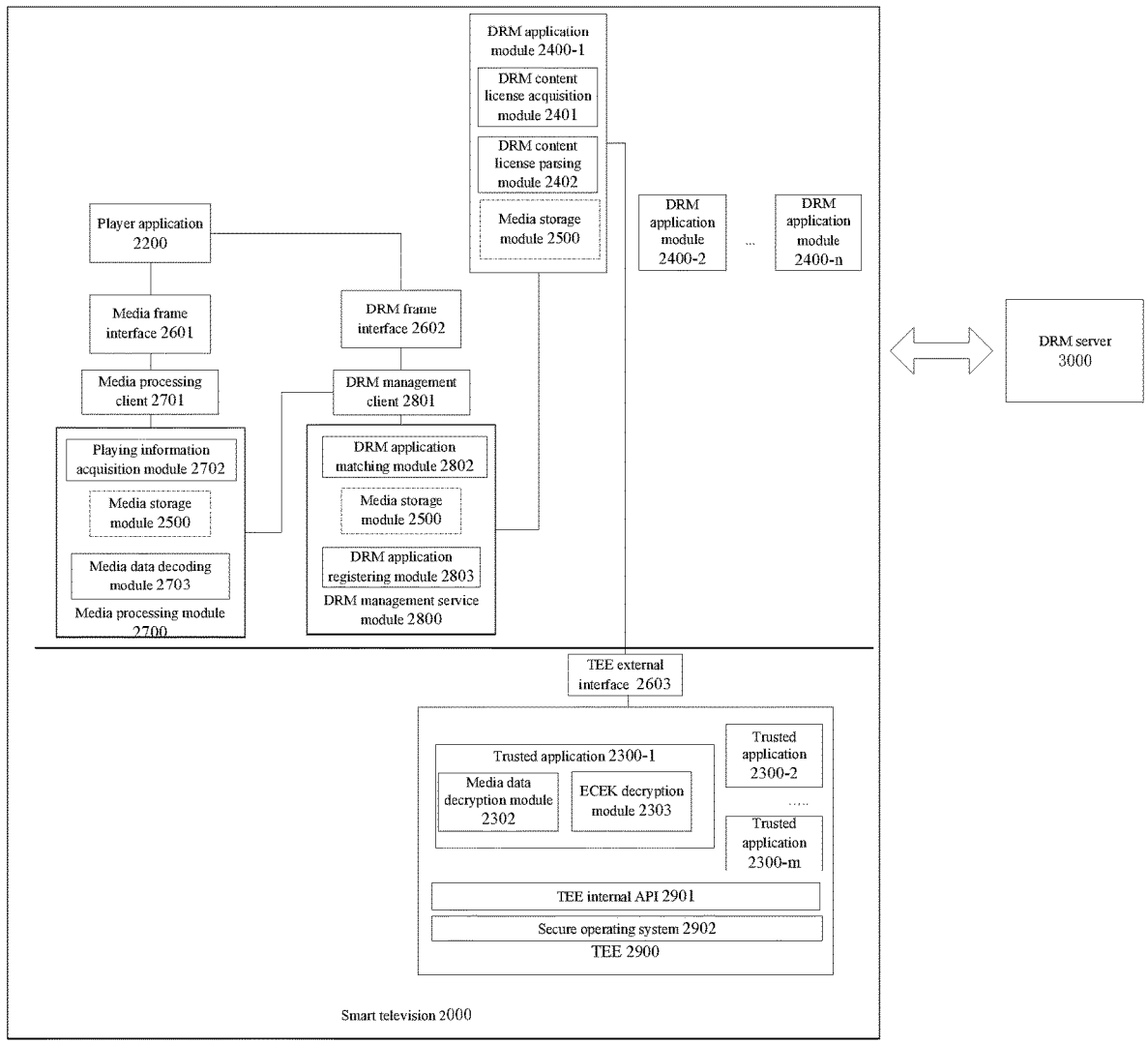
FIG. 3 shows a flowchart of a DRM method for an intelligent operating system according to a second embodiment of the present invention.

According to the first embodiment of the present invention, as shown in FIGS. 2 and 3, with the smart television as an example, a DRM method for an intelligent operating system 2100 according to the present embodiment is implemented in a smart television 2000 provided with the intelligent operating system 2100. In one embodiment, the smart television 2000 may be a set top box or an integrated set top box. The smart television 2000 comprises a trusted execution environment (TEE) 2900. The TEE 2900 comprises a hardware resource, a TEE internal API 2901 and a secure operating system 2902 which are isolated from the intelligent operating system. The method comprises the following steps.

S1: a play list of media data to be played and encrypted media data are acquired, wherein the play list comprises play address information and DRM information of the media data to be played, and the DRM information contains a DRM application module identifier for identifying a DRM application module adopted by the media data to be played.

S2: one or more DRM application modules registered in the operating system are inquired, and the DRM application module corresponding to the DRM application module identifier is acquired and loaded, wherein the DRM application module contains an identifier for identifying a trusted application (TA) module adopted by the DRM application module in the TEE.

The DRM application module may be a fragment of an application program or plug-in and provided by different DRM manufacturers. Before such step, the method further comprises a step of registering such one or more DRM application modules in the intelligent operating system. Particularly, before loading the DRM application module, whether a signature of the DRM application module is legitimate still needs to be checked, and the DRM application module is loaded in the case that the signature is legitimate.

S3: DRM authorization is requested by the DRM application module from a DRM server, and a DRM content license is acquired and analyzed, thereby judging a content permission and acquiring an encrypted content encryption key (ECEK) and transmitting the ECEK to the TEE.

S4: after judging that the content permission is legitimate, the encrypted media data is stored to a shared cache region between the TEE and the intelligent operating system.

S5: the ECEK is acquired by the TA module which is in the TEE and corresponds to the TA module identifier contained by the DRM application module, the ECEK is decrypted based on a preset content encryption key (CEK) decryption mechanism in the TA module to acquire a CEK, and the encrypted media data stored in the shared cache region is decrypted by using the CEK.

Particularly, a plurality of TA modules may be disposed. The TA modules may be personalized DRM TAs provided by different DRM manufacturers and set in the TEE 2900 of the smart television in a preset manner or a downloadable manner. The TA modules may also be common DRM TAs adaptive to all DRM manufacturers in terms of basic functions. The preset CEK decryption mechanism in the TA module comprises: acquiring a private key paired with a public key adopted by encryption of the CEK from a one time programmable memory chip of the smart television or the security storage region of the TEE for decrypting the ECEK.

S6: the decrypted media data is stored in a security cache region for decoding and outputting. Particularly, the method further comprises: acquiring and decoding the decrypted media data from the security cache region, and outputting the decoded decrypted media data by high-bandwidth digital dontent protection (HDCP).

The foregoing has described the first embodiment according to the present invention. The smart television realizes DRM functions by using the TEE, thereby ensuring that the DRM terminal can support multiple DRM manufacturers, can be freely switched among multiple DRM manufacturers and has the beneficial effects such as high security and upgradability. The smart television comprises two parts including the smart television operating system and the TEE. The DRM management service module provides a DRM service function and manages the loading, upgrading and operation of the DRM application modules in a unified manner. Since the DRM application modules are provided by different DRM manufacturers and are applied with unified management in the DRM management service module, the DRM applications of different standards and different manufacturers can realize unified management. The support of the TEE can be provided for the DRM application modules, and the capacity of the TEE is provided for the DRM application modules.

The TEE comprises the hardware resource, a secure operating system (Secure OS), a TEE internal API and the DRM TA modules which are isolated from the intelligent operating system. The hardware resource isolated from the intelligent operating system comprises a CPU, a memory, a secure storage, a secure clock, a encryption and decryption algorithms (crypto APIs), a descramble interface, etc. The intelligent operating system interacts with the TEE by using a TEE external interface. The united management of the DRM functions is realized and the multiple DRM application modules can be supported. The TEE is provided for realizing the DRM functions, and the security of the DRM functions is ensured. Meanwhile, the DRM application modules of respective manufacturers are effectively isolated, and the system security is guaranteed.

Second Embodiment

The foregoing has described the first embodiment of the present invention in combination with the accompanying drawings. The second embodiment according to the present invention will be described in the following. There is provided a DRM system for an intelligent operating system, which corresponds to the method of the first embodiment. As shown in FIG. 3, the DRM system is disposed in a smart television 2000 provided with the intelligent operating system. The smart television 2000 comprises a media processing module 2700, a DRM management service module 2800 and a TEE 2900. The TEE 2900 comprises a hardware resource and an interactive interface, for example a TEE internal interface 2901 and a secure OS 2902, which are isolated from the intelligent operating system.

A player application 2200 is configured to play content.

The media processing module 2700 comprises: a play information acquisition module 2702, configured to acquire a play list of media data to be played and encrypted media data, wherein the play list comprises play address information and DRM information of the media data to be played, and the DRM information contains a DRM application module identifier for identifying a DRM application module adopted by the media data to be played.

The DRM management service module 2800 comprises: a DRM application matching module 2802, configured to inquire one or more DRM application modules 2400-1 . . . 2400-n registered in the operating system, and acquire and load the DRM application module 2400-i corresponding to the DRM application module identifier, wherein the DRM application module contains an identifier for identifying a TA module 2300-i adopted by the DRM application module in the TEE 2900.

Preferably, the DRM application matching module 2802 is further configured to, before loading the DRM application module, check whether a signature of the DRM application module is legitimate, and load the DRM application module in the case that the signature is legitimate.

Preferably, the DRM management service module 2800 further comprises a DRM application registering module 2803, configured to register the DRM application modules in the intelligent operating system.

The loaded DRM application module, for example 2400-1, comprises: a DRM content license acquisition module 2401, configured to request DRM authorization from a DRM server 3000, and acquire a DRM content license; and a DRM content license parsing module 2402, configured to analyze the acquired content license, thereby judging a content permission and acquiring an ECEK, and transmitting the ECEK to the TEE 2900.

The media processing module 2700 comprises: a media storage module 2500, configured to, after judging that the content permission is legitimate, store the encrypted media data to a shared cache region between the TEE 2900 and the intelligent operating system.

The TEE 2900 comprises one or more TA modules 2300-1 . . . 2300-m.

The TA module, for example 2300-1, corresponding to the TA module identifier contained by the DRM application module, comprises: an ECEK decryption module 2303, configured to acquire the ECEK, and decrypt the ECEK based on a preset CEK decryption mechanism in the TA module to acquire a CEK.

Particularly, a plurality of TA modules may be disposed. The TA modules may be personalized trusted applications (personalized TAs) provided by different DRM manufacturers and set in the TEE 2900 of the smart television in a preset manner or a downloadable manner. The TA modules may also be common TAs adaptive to all DRM manufacturers in terms of basic functions. The preset CEK decryption mechanism in the TA module 2300-1 comprises: acquiring a private key paired with a public key adopted by encryption of the CEK from a one time programmable (OTP) memory chip of the smart television or the security storage region of the TEE for decrypting the ECEK.

The TA further comprises a media data decryption module 2302, configured to decrypt the encrypted media data stored in the shared cache region by using the CEK, and store the decrypted media data in a security cache region for decoding and outputting.

The media processing module 2700 further comprises: a media data decoding module 2703, configured to acquire and decode the decrypted media data from the security cache region, and output the decoded decrypted media data by HDCP.

The media processing module 2700 is further configured to execute media data play.

More preferably, the media processing module 2700 is implemented as a client-server structure and further comprises a media processing client 2701 as a client, which is configured to interact with the media processing module 2700 as a server to realize sending and receiving of a media processing request of the client. The media processing module 2700, as the server, processes and schedules the media processing request in response to the client and returns a processing result.

Similarly, the DRM management service module 2800 is also implemented as a client-server structure and further comprises a DRM management client 2801 as the client, which is configured to interact with the DRM management service module 2800 as the server to realize the sending and receiving of a DRM management request of the client. The DRM management service module 2800, as the server, processes and schedules the DRM management request in response to the client and returns a processing result.

More preferably, there is provided a standardized media frame interface 2601 between the player application 2600 and the media processing module 2700 for the player application 2200 to call the corresponding functions of the media processing module 2700. There is provided a standardized DRM frame interface 2602 between the player application 2600 and the DRM management service module 2800 for the player application 2200 to call the corresponding functions of the DRM management service module 2800. Besides, there is provided a standardized TEE external interface 2603 between the DRM application module 2400-1 and the TEE 2900 for the DRM application module 2400-1 to call the corresponding functions of the TEE 2900.

Third Embodiment

Figure 4:
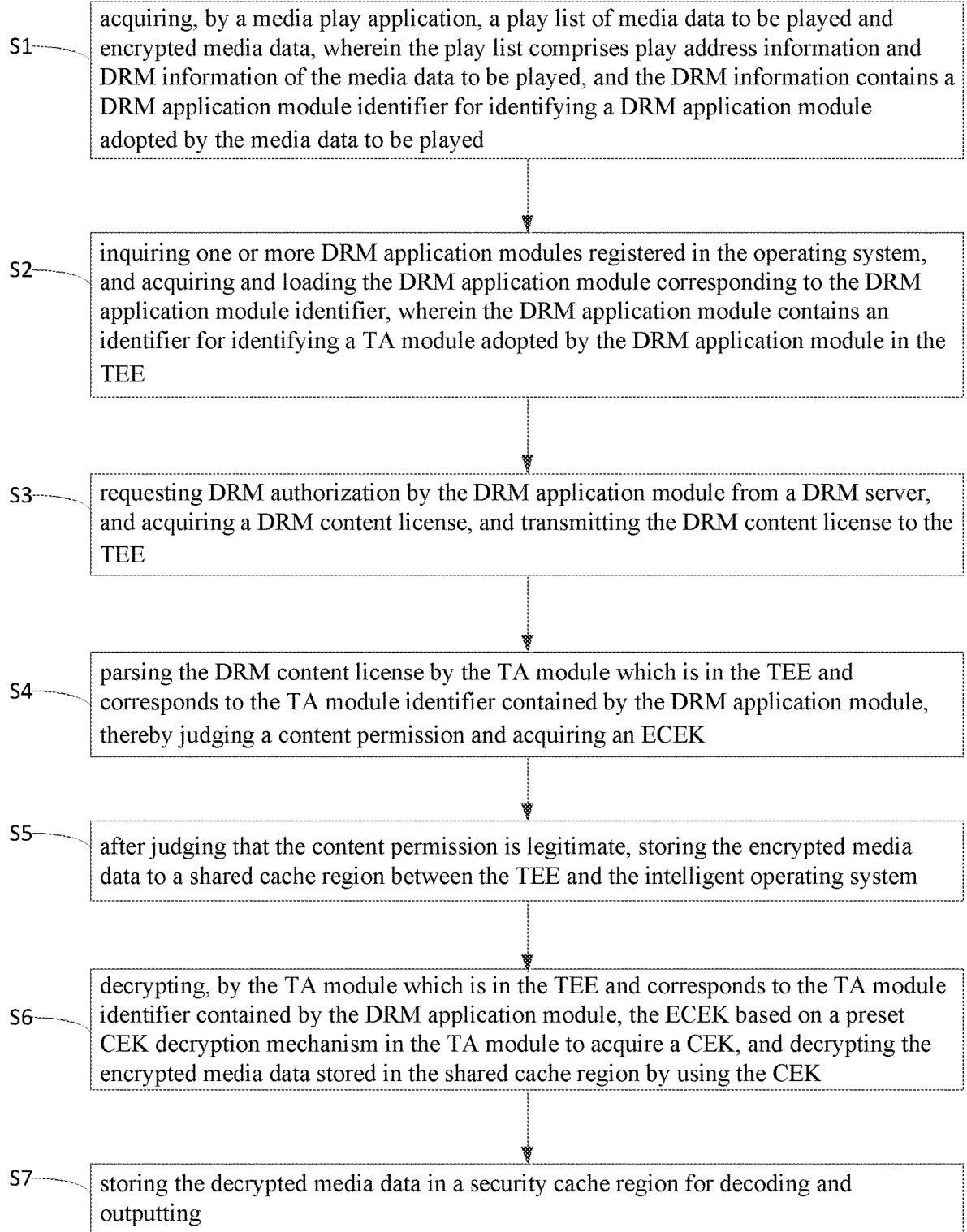
FIG. 4 shows a flowchart of a DRM method for an intelligent operating system according to a third embodiment of the present invention.
Figure 5:
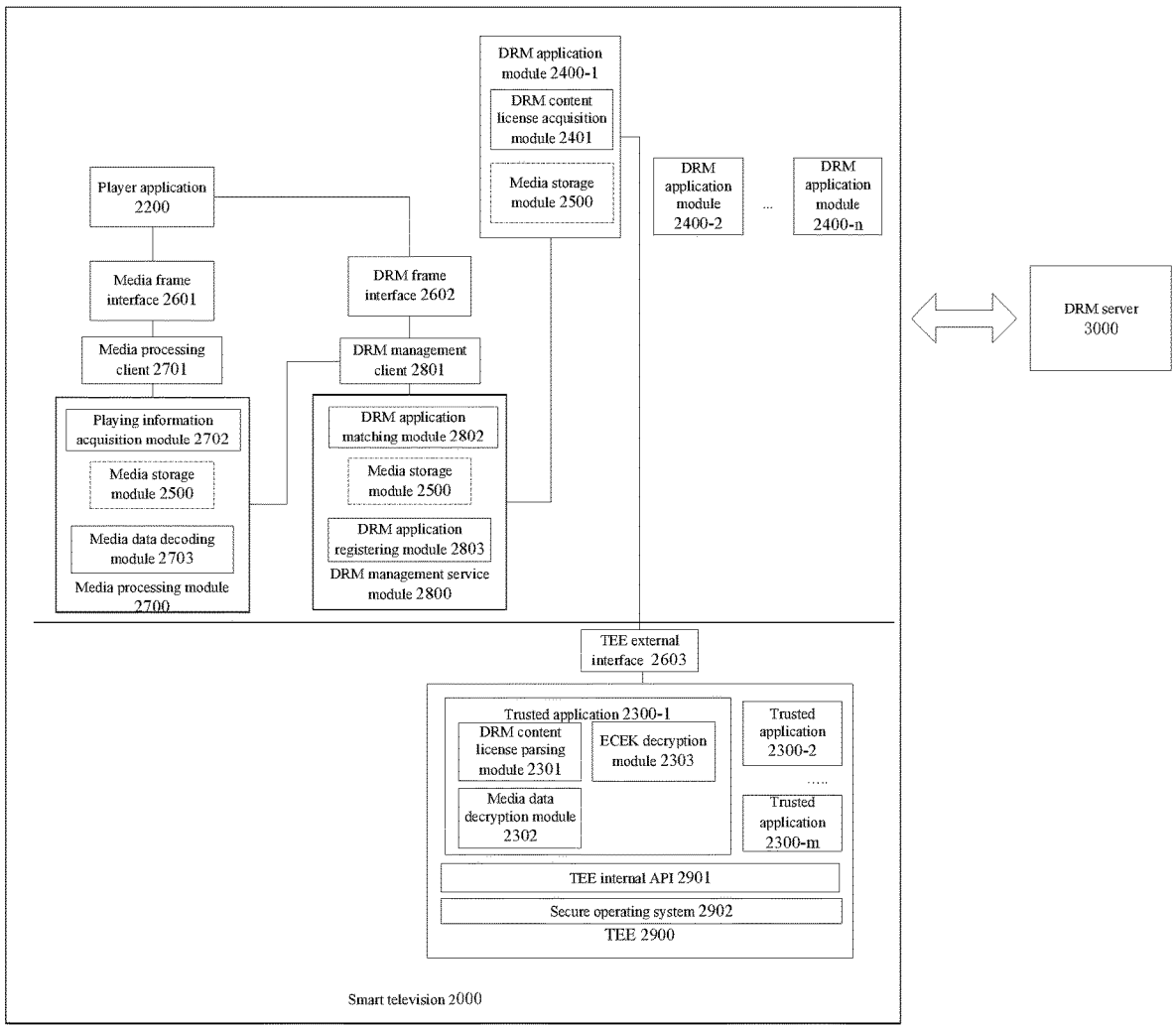
FIG. 5 shows a block diagram of a DRM system for an intelligent operating system according to a fourth embodiment of the present invention.

According to the third embodiment of the present invention, as shown in FIGS. 4 and 5, with the smart television as an example, a DRM method for an intelligent operating system 2100 according to the present embodiment is implemented in an intelligent device 2000 provided with the intelligent operating system 2100. In one embodiment, the smart television 2000 may be a set top box or an integrated set top box. The smart television 2000 comprises a TEE 2900. The TEE 2900 comprises a hardware resource, a TEE internal API 2901 and a secure OS 2902 which are isolated from the intelligent operating system. The method comprises the following steps.

S1: a play list of media data to be played and encrypted media data are acquired, wherein the play list comprises play address information and DRM information of the media data to be played, and the DRM information contains a DRM application module identifier for identifying a DRM application module adopted by the media data to be played.

S2: one or more DRM application modules registered in the operating system are inquired, and the DRM application module corresponding to the DRM application module identifier is acquired and loaded, wherein the DRM application module contains an identifier for identifying a TA module adopted by the DRM application module in the TEE.

The DRM application module may be a fragment of an application program or plug-in and provided by different DRM manufacturers. Before such step, the method further comprises the step of registering such one or more DRM application modules in the intelligent operating system. Particularly, before loading the DRM application module, whether a signature of the DRM application module is legitimate still needs to be checked, and the DRM application module is loaded in the case that the signature is legitimate.

S3: DRM authorization is requested by the DRM application module from a DRM server, and a DRM content license is acquired and transmitted to the TEE.

S4: the DRM content license is analyzed by the TA module which is in the TEE and corresponds to the TA module identifier contained by the DRM application module, thereby judging a content permission and acquiring an ECEK.

Particularly, a plurality of TA modules may be disposed. The TA modules may be personalized DRM TAs provided by different DRM manufacturers and set in the TEE 2900 of the smart television in a preset manner or a downloadable manner. The TA modules may also be common DRM TAs adaptive to all DRM manufacturers in terms of basic functions.

S5: after judging that the content permission is legitimate, the encrypted media data is stored to a shared cache region between the TEE and the intelligent operating system.

S6: by the TA module which is in the TEE and corresponds to the TA module identifier contained by the DRM application module, the ECEK is decrypted based on a preset CEK decryption mechanism in the TA module to acquire a CEK, and the encrypted media data stored in the shared cache region is decrypted by using the CEK.

The preset CEK decryption mechanism in the TA module comprises: acquiring a private key paired with a public key adopted by encryption of the CEK from a one time programmable (OTP) memory chip of the smart television or the security storage region of the TEE for decrypting the ECEK.

S7: The decrypted media data is stored in a security cache region for decoding and outputting. The method further comprises: acquiring and decoding the decrypted media data from the security cache region, and outputting the decoded decrypted media data by HDCP.

The foregoing has described the third embodiment according to the present invention. The smart television realizes the DRM functions by using the TEE, thereby ensuring that the DRM terminal can support multiple DRM manufacturers, can be freely switched among multiple DRM manufacturers and has the beneficial effects such as high security and upgradability. The smart television comprises two parts including the smart television operating system and the TEE. The DRM management service module provides a DRM service function and manages the loading, upgrading and operation of the DRM application modules in a unified manner. Since the DRM application modules are provided by different DRM manufacturers and are applied with unified management in the DRM management service module, the DRM applications of different standards and different manufacturers can realize unified management. The support of the TEE can be provided for the DRM application modules, and the capacity of the TEE is provided for the DRM application modules.

The TEE comprises a hardware resource, a secure OS, a TEE Internal API and the DRM TA modules which are isolated from the intelligent operating system. The hardware resource isolated from the intelligent operating system comprises a CPU, a memory, a secure storage, a secure clock, encryption and decryption algorithms (crypto APIs), a descramble interface, etc. The intelligent operating system interacts with the TEE by using a TEE external interface. The unified management of the DRM functions is realized and the multiple DRM application modules can be supported. The TEE is provided for realizing the DRM functions, and the security of the DRM functions is ensured. Meanwhile, the DRM application modules of respective manufacturers are effectively isolated, and the system security is guaranteed.

Fourth Embodiment

The foregoing has described the third embodiment of the present invention in combination with the accompanying drawings. The fourth embodiment according to the present invention will be described hereinafter. There is provided a DRM system for an intelligent operating system, which corresponds to the method of the third embodiment. As shown in FIG. 5, the DRM system is disposed in a smart television 2000 provided with the intelligent operating system. The intelligent device comprises a media processing module 2700, a DRM management service module 2800 and a TEE 2900. The TEE 2900 comprises a hardware resource and an interactive interface, for example a TEE internal interface 2901 and a secure OS 2902, which are isolated from the intelligent operating system.

A player application 2200 is configured to play content.

The media processing module 2700 comprises: a play information acquisition module 2701, configured to acquire a play list of media data to be played and encrypted media data, wherein the play list comprises play address information and DRM information of the media data to be played, and the DRM information contains a DRM application module identifier for identifying a DRM application module adopted by the media data to be played.

The DRM management service module 2800 comprises: a DRM application matching module 2802, configured to inquire one or more DRM application modules 2400-1 . . . 2400-*n* registered in the operating system, and acquire and load the DRM application module 2400-*i* corresponding to the DRM application module identifier, wherein the DRM application module contains an identifier for identifying a TA module 2300-*i* adopted by the DRM application module in the TEE 2900.

Preferably, the DRM application matching module 2802 is further configured to, before loading the DRM application module, check whether a signature of the DRM application module is legitimate, and load the DRM application module in the case that the signature is legitimate.

The DRM management service module 2800 further comprises a DRM application registering module 2803, configured to register the DRM application modules in the intelligent operating system.

The loaded DRM application module, for example 2400-1, comprises: a DRM content license acquiring unit 2401, configured to request DRM authorization from a DRM server 3000, acquire a DRM content license and transmit the DRM content license to the TEE 2900.

The TEE 2900 comprises one or more TA modules 2300-1 . . . 2300-*m*.

The TA module, for example 2300-1, corresponding to the TA module identifier contained by the DRM application module comprises: a DRM content license parsing module 2301, configured to analyze the DRM content license, thereby judging a content permission and acquiring an ECEK; and an ECEK decryption module 2303, configured to, after judging that the content permission is legitimate, decrypt the ECEK based on a preset CEK decryption mechanism in the TA module to acquire a CEK.

Particularly, a plurality of TA modules may be disposed. The TA modules may be personalized TAs provided by different DRM manufacturers and set in the TEE 2900 of the smart television in a preset manner or a downloadable manner. The TA modules may also be common TAs adaptive to all DRM manufacturers in terms of basic functions. The preset CEK decryption mechanism in the TA module 2300-1 comprises: acquiring a private key paired with a public key adopted by encryption of the CEK from a one time programmable (OTP) memory chip of the smart television or the security storage region of the TEE for decrypting the ECEK.

The media processing module 2700 further comprises: a media storage module 2500, configured to, after judging that the content permission is legitimate, store the encrypted media data to a shared cache region between the TEE and the intelligent operating system.

The TA module, for example 2300-1, further comprises: a media data decryption module 2302, configured to decrypt the encrypted media data stored in the shared cache region by using the CEK, and store the decrypted media data in a security cache region for decoding and outputting.

The media processing module 2700 further comprises: a media data decoding module 2703, configured to acquire and decode the decrypted media data from the security cache region, and output the decoded decrypted media data by HDCP.

The media processing module 2700 is further configured to play media data.

More preferably, the media processing module 2700 is implemented as a client-server structure and further comprises a media processing client 2701 as a client, which is configured to interact with the media processing module as a server to realize sending and receiving of a media processing request of the client. The media processing module 2700, as the server, processes and schedules the media processing request in response to the client and returns a processing result.

Similarly, the DRM management service module 2800 is also implemented as a client-server structure and further comprises a DRM management client 2801 as the client, which is configured to interact with the DRM management service module 2800, as the server, to realize the sending and receiving of a DRM management request of the client. The DRM management service module 2800, as the server, processes and schedules the DRM management request in response to the client and returns a processing result.

More preferably, there is provided a standardized media frame interface 2601 between the player application 2200 and the media processing module 2700 for the player application 2200 to call the corresponding functions of the media processing module 2700. There is provided a standardized DRM frame interface 2602 between the player application 2600 and the DRM management service module 2800 for the player application 2200 to call the corresponding functions of the DRM management service module 2800. Besides, there is provided a standardized TEE external interface 2603 between the DRM application module 2400-1 and the TEE 2900 for the DRM application module 2400-1 to call the corresponding functions of the TEE 2900.

While certain specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the invention. The scope of the present invention is subject to the attached claims.

What is claimed is:

1. A digital rights management (DRM) method for an intelligent operating system, wherein the method is implemented in an intelligent device provided with the intelligent operating system, the intelligent device comprises a trusted execution environment (TEE), and the method comprising:

acquiring a play list of media data to be played and encrypted media data, wherein the play list comprises play address information and DRM information of the media data to be played, and the DRM information contains a DRM application module identifier for identifying a DRM application module adopted by the media data to be played;

inquiring one or more DRM application modules registered in the operating system, and acquiring and loading the DRM application module corresponding to the DRM application module identifier, wherein the DRM application module contains an identifier for identifying a trusted application (TA) module adopted by the DRM application module in the TEE;

requesting DRM authorization by the DRM application module from a DRM server, and acquiring and parsing a DRM content license, thereby judging a content permission and acquiring an encrypted content encryption key (ECEK) and transmitting the ECEK to the TEE;

after judging that the content permission is legitimate, storing the encrypted media data to a shared cache region between the TEE and the intelligent operating system;

acquiring the ECEK by the TA module which is in the TEE and corresponds to the TA module identifier contained by the DRM application module, decrypting the ECEK based on a preset content encryption key (PCEK) decryption mechanism in the TA module to acquire a content encryption key (CEK), and decrypting the encrypted media data stored in the shared cache region by using the CEK; and storing the decrypted media data in a security cache region for decoding and outputting.

2. The method according to claim 1, wherein the TEE comprises a hardware resource, a TEE internal API and a security operating system which are isolated from the intelligent operating system.

3. The method according to claim 1, wherein the step of loading the DRM application module corresponding to the DRM application module identifier comprises: before loading the DRM application module, checking whether a signature of the DRM application module is legitimate, and loading the DRM application module in the case that the signature is legitimate.

4. The method according to claim 1, wherein by further comprising a step of: before the step of inquiring one or more DRM application modules registered in the operating system, registering such one or more DRM application modules in the intelligent operating system.

5. The method according to claim 1, wherein the method further comprises: acquiring and decoding the decrypted media data from the security cache region, and outputting the decoded decrypted media data by high-bandwidth digital dontent protection (HDCP).

6. The method according to claim 1, wherein the PCEK decryption mechanism in the TA module is configured to acquire a private key paired with a public key adopted by encryption of the CEK from a one time programmable (OTP) memory chip of the intelligent device or the security storage region of the TEE for decrypting the ECEK.

7. A digital rights management (DRM) method for an intelligent operating system, wherein the method is implemented in an intelligent device provided with the intelligent operating system, the intelligent device comprises a trusted execution environment (TEE), and the method comprising:

acquiring, by a media play application, a play list of media data to be played and encrypted media data, wherein the play list comprises play address information and DRM information of the media data to be played, and the DRM information contains a DRM application module identifier for identifying a DRM application module adopted by the media data to be played;

inquiring one or more DRM application modules registered in the operating system, and acquiring and loading the DRM application module corresponding to the GRIM application module identifier, wherein the DRM application module contains an identifier for identifying a trusted application (TA) module adopted by the DRM application module in the TEE;

requesting DRM authorization by the DRM application module from a DRM server, and acquiring a DRM content license, and transmitting the DRM content license to the TEE;

parsing the DRM content license by the TA module which is in the TEE and corresponds to the TA module identifier contained by the DRM application module, judging a content permission and acquiring an encrypted content encryption key (ECEK);

after judging that the content permission is legitimate, storing the encrypted media data to a shared cache region between the TEE and the intelligent operating system;

decrypting, by the TA module which is in the TEE and corresponds to the TA module identifier contained by the DRM application module, the ECEK based on a preset content encryption key (PCEK) decryption mechanism in the TA module to acquire a content encryption key (CEK), and decrypting the encrypted media data stored in the shared cache region by using the CEK; and storing the decrypted media data in a security cache region for decoding and outputting.

8. The method according to claim 7, wherein the TEE comprises a hardware resource, a TEE internal API and a security operating system which are isolated from the intelligent operating system.

9. The method according to claim 7, wherein the step of acquiring the DRM application module corresponding to the DRM application module identifier for loading comprises: before loading the DRM application module, checking whether a signature of the DRM application module is legitimate, and loading the DRM application module in the case that the signature is legitimate.

10. The method according to claim 7, wherein by further comprising a step of: before the step of inquiring one or more DRM application modules registered in the operating system, registering the DRM application modules in the intelligent operating system.

11. The method according to claim 7, wherein in that the method further comprises: acquiring and decoding the decrypted media data from the security cache region, and outputting the decoded decrypted media data by HDCP.

12. The method according to claim 7, wherein the PCEK decryption mechanism in the TA module is configured to acquire a private key paired with a public key adopted by encryption of the CEK from a chip of the intelligent device or the security storage region of the TEE for decrypting the ECEK.

13. A digital rights management (DRM) system for an intelligent operating system, wherein the DRM system is disposed in an intelligent device provided with the intelligent operating system, and the intelligent device comprises a media processing module, a DRM management service module and a trusted execution environment (TEE), wherein the media processing module comprises:
a play information acquisition module, configured to acquire a play list of media data to be played and encrypted media data, wherein the play list comprises play address information and DRM information of the media data to be played, and the DRM information contains a DRM application module identifier for identifying a DRM application module adopted by the media data to be played;

the DRM management service module comprises:
a DRM application matching module, configured to inquire one or more DRM application modules registered in the operating system, and acquire and load the DRM application module corresponding to the DRM application module identifier, wherein the DRM application module contains an identifier for identifying a trusted application (TA), module adopted by the DRM application module in the TEE;

the loaded DRM application module comprises:
a DRM content license acquisition module, configured to request DRM authorization from a DRM server to acquire a DRM content license; and
a DRM content license parsing module, configured to analyze the acquired content license, thereby judging a content permission and acquiring an encrypted content encryption key (ECEK), and transmitting the ECEK to the TEE;

the media processing module further comprises:
- a media storage module, configured to, after judging that the content permission is legitimate, store the encrypted media data to a shared cache region between the TEE and the intelligent operating system;

the TEE comprises one or more TA modules; wherein
the TA module corresponding to the TA module identifier contained by the DRM application module comprises:
- an ECEK decryption module, configured to acquire the ECEK, and decrypt the ECEK based on a preset content encryption key (PCEK) decryption mechanism in the TA module to acquire a content encryption key (CEK); and
- a media data decryption module, configured to decrypt the encrypted media data stored in the shared cache region by using the CEK, and store the decrypted media data in a security cache region for decoding and outputting.

14. The system according to claim 13, wherein the TEE comprises a hardware resource, a TEE internal API and a security operating system which are isolated from the intelligent operating system.

15. The system according to claim 13, wherein the DRM application module matching module is further configured to, before loading the DRM application module, check whether a signature of the DRM application module is legitimate, and load the DRM application module in the case that the signature is legitimate.

16. The system according to claim 13, wherein the DRM management service module further comprises a DRM application registering module, configured to register the DRM application modules in the intelligent operating system.

17. The system according to claim 13, wherein the media processing module further comprises: a media data decoding module, configured to acquire and decode the decrypted media data from the security cache region, and output the decoded decrypted media data by HDCP.

18. The system according to claim 13, wherein the PCEK decryption mechanism in the TA module is configured to acquire a private key paired with a public key adopted by encryption of the CEK from a chip of the intelligent device or the security storage region of the TEE for decrypting the ECEK.

* * * * *